C. EHLERS.
LOADER.
APPLICATION FILED NOV. 2, 1908.

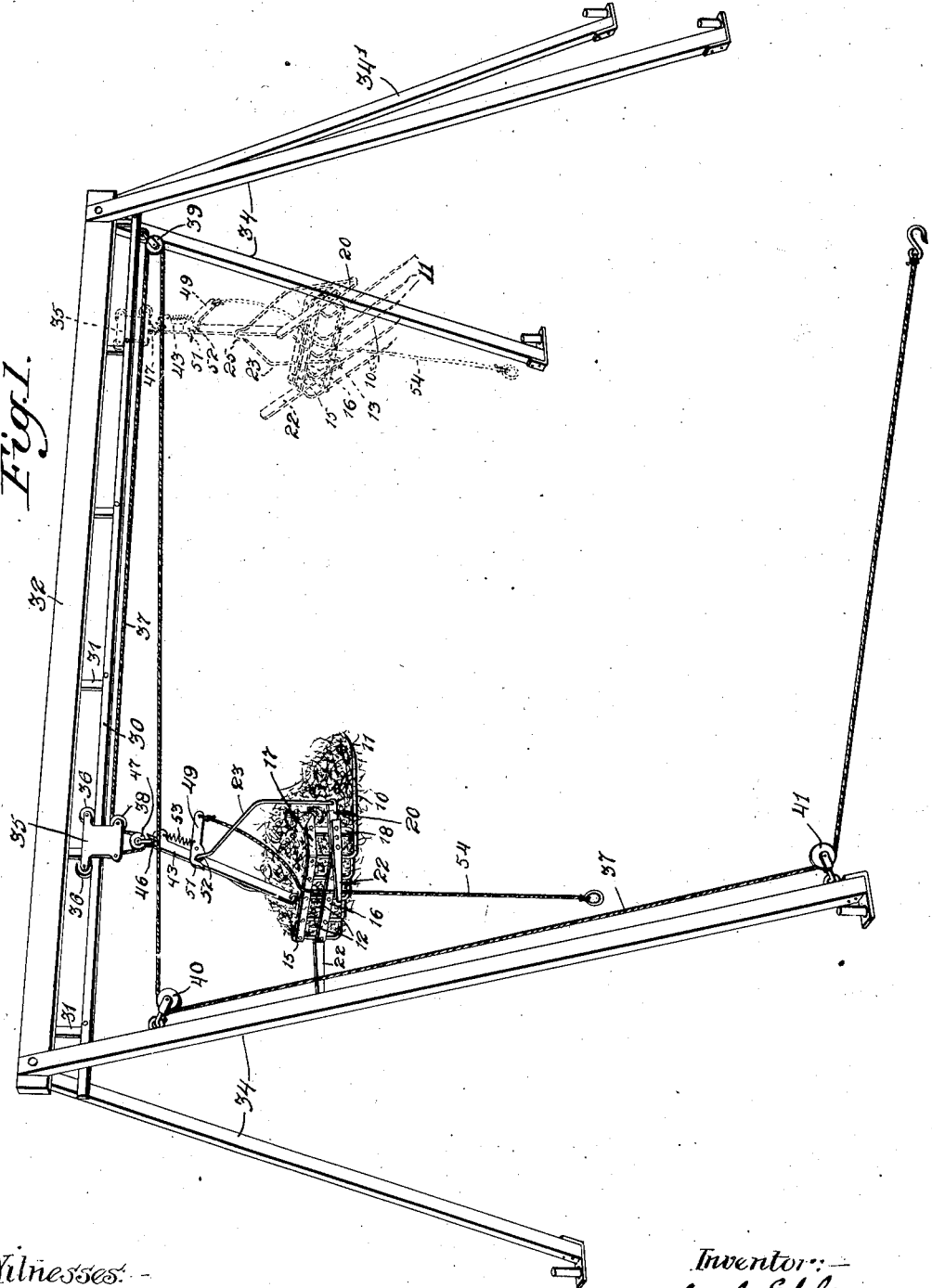

967,892.

Patented Aug. 23, 1910.
2 SHEETS—SHEET 2.

Witnesses:—
Frank W. Bemm
Laurence S. Russell

Inventor:—
Carl Ehlers
By Fred Gerlach
his Atty

UNITED STATES PATENT OFFICE.

CARL EHLERS, OF MINDEN, IOWA.

LOADER.

967,892.  Specification of Letters Patent.   Patented Aug. 23, 1910.

Application filed November 2, 1908. Serial No. 460,630.

*To all whom it may concern:*

Be it known that I, CARL EHLERS, a resident of Minden, in the county of Pottawattamie and State of Iowa, have invented certain new and useful Improvements in Loaders, of which the following is a full, clear, and exact description.

The invention relates to loading-apparatus and more particularly to that type which may be employed for loading manure onto a wagon or spreader.

The invention designs to provide an improved loader which embodies a carrier comprising teeth for entering manure or similar material to scoop a load of material from a pile, and which can then be drawn away with the load thereon and elevated into position above the wagon or spreader to dump the load into the wagon or spreader. In practice a manure-spreader is usually loaded by throwing the manure into the wagon with a pitch-fork, and as a result, the spreader must necessarily remain idle while it is being loaded. By providing a toothed carrier which may be loaded by forcing it into a manure pile to scoop a quantity of material from a stack, and then elevating it quickly into position to dump the load into the spreader, the loading operation will be greatly facilitated so that the spreader will not remain idle during a slow loading operation.

The object of the invention is to provide improved loading apparatus which may be advantageously used for loading manure or the like and by which a wagon or a spreader may be quickly and conveniently loaded.

The invention consists in the several novel features hereinafter set forth and more particularly defined by claim at the conclusion hereof.

Figure 3:
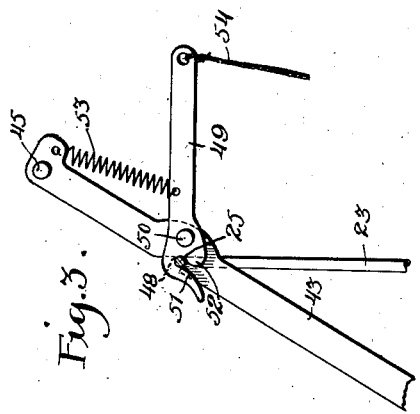
Figure 4:
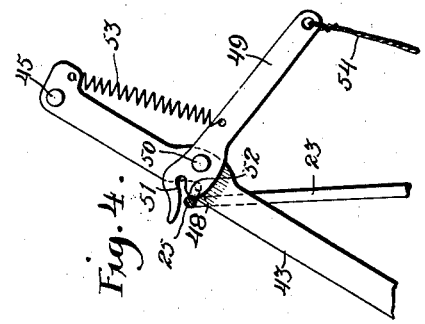
Figure 2:
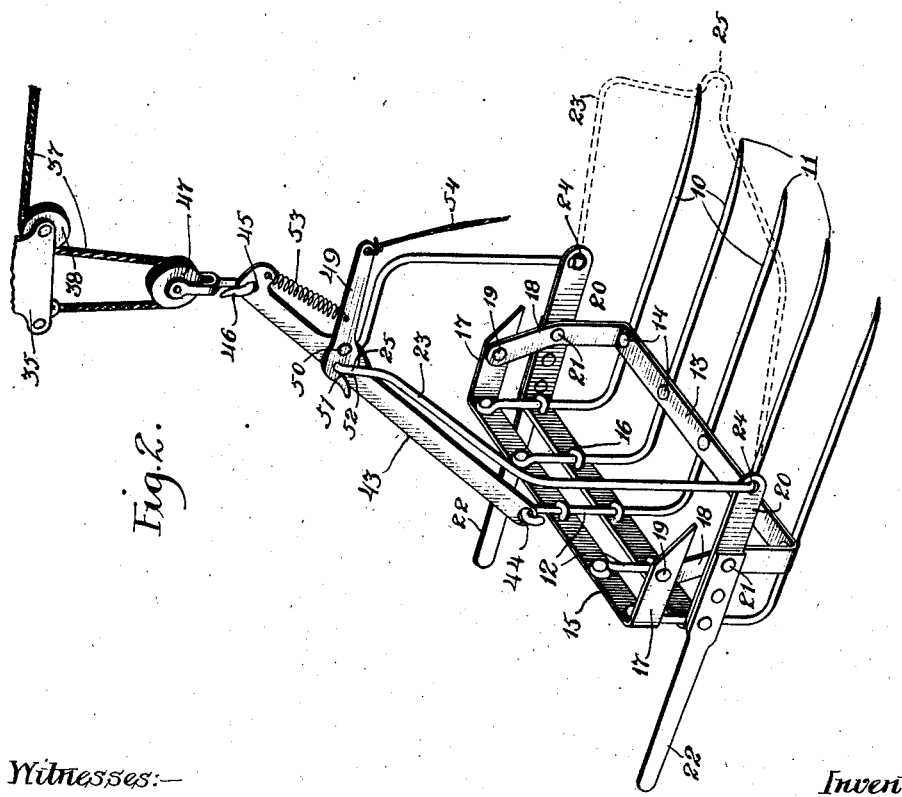

In the drawings: Figure 1 is a perspective of a loading apparatus embodying the invention. Fig. 2 is a perspective of the improved carrier. Fig. 3 is a detail of tripping-device for releasing the forked carrier to dump the load in position to hold the suspension-device for the carrier in such position that the load will remain in the carrier. Fig. 4 is a similar view, the tripping-device being shown in position to release the carrier to dump the load.

The loading-apparatus comprises a carrier which consists essentially of a series of points or teeth 10, having their front ends pointed as at 11 to facilitate entry of the teeth into a manure pile or other material to be loaded. The teeth 10 serve as a bottom on which the load of such material will be held and are extended vertically as at 12 to serve as a back for the carrier whereby the load will be held on carrier-teeth 10. The teeth are cross-connected by a bottom-bar 13 to which they are secured by rivets or staples 14 and the backs 12 of the carrier-teeth are secured together in separated relation by an upper bar 15 and a lower bar 16. The upper back-bar 15 has its ends extended forwardly as at 17, and secured to upright-bars 18 by rivets 19 and these bars 18 are disposed at the sides of the carrier and formed by extending the ends of the bottom-bar 13 upwardly. The back-bar 16 is also extended forwardly at each side as at 20 and is secured to the uprights 18 by rivets 21. The back-bars 15 and 16, sides 17, and 20, bottom-bar 13, and uprights 18 constitute an open frame to which the carrier-teeth 10 are secured and from which they project forwardly so the teeth will penetrate a pile of material such as manure, to scoop a load of the material from a pile, so that the material will be superposed on the teeth and held by the frame for removal to a wagon or spreader. A rearwardly extending handle 22 is secured to each side of the carrier-frame and these handles serve as means for directing the teeth into the pile to catch a load from the desired portion of the pile. This construction of the carrier provides one which embodies projecting points for penetrating a pile and by which a load may be quickly removed from a pile and loaded into the carrier and securely held for transportation to such place as it may be desired to dump the load.

A draw-bar or bail 23 by which the loaded carrier may be drawn from the pile of material, has its sides respectively pivoted as at 24 in the side-bars 20 of the carrier. This draw-bar or bail, when swung into position illustrated in dotted lines Fig. 2, may be drawn forwardly to bring the carrier to the pile to cause the carrier-teeth to penetrate a pile of material, and to cause the loaded carrier to be drawn over the ground and away from the pile. By connecting a hook at the central or loop portion 25 thereof, the other end of the rope being attached to a horse or team, the carrier may be manipulated as desired. When disconnected from the draft rope the bail 23 may be swung into substantially vertical position to serve as one of the suspension-elements by which the carrier and load may be elevated into position to be dumped where desired.

When the carrier has been loaded, it is usually necessary to elevate it into position above the wagon or spreader so that the load may be quickly dumped or discharged into the wagon or spreader. For this purpose an elevated or overhead track or guide 30 is provided for transporting the loaded carrier approximately from the point where it is loaded to such a position that a load may be discharged directly from the carrier into the vehicle. This overhead track may be supported in any suitable manner and is illustrated as being secured to hangers 31 which are secured to a girder 32 which is held in elevated position by trusses or columns 34, and these supports are usually anchored in some convenient manner to the ground and the girder is also held by an end-brace 34'. A carriage 35 is provided with wheels 36 mounted to travel along the track 30 from one end thereof to the other. A cable 37 having one of its ends secured to the carriage 35 and extending around a guide-sheave 38 on the track, thence around a sheave 39 located at that end of the track where the carrier is to be dumped, and thence around a guide-sheave 40 connected to one of the columns 34 at the opposite end of the track and thence around a guide-sheave 41 to a hook whereby the cable may be connected to a horse or team, so that when the cable is drawn by the horse or team the carriage 35 will be drawn from that end of the track which is nearest the pile of material to the other end thereof, beneath which the vehicle to receive the load is located.

A suspension-bar 43 to which the draw-bar 23 may be connected so that the loaded carrier may be elevated and transported bodily without discharging the load, has its end pivotally connected to the carrier at 44, and its upper end has a hole 45 therein, adapted to receive a hook 46. Said hook is connected to a sheave 47 around which the draft-cable 37 extends so that when the cable is connected to the suspension-bar 43 by said sheave 47 and hook 46, the cable 37 when operated by the horse or team, will elevate the suspension-bar and carrier from the ground or pile and into close proximity to the overhead track and until the upward movement of the sheave 47 is arrested by carriage 35. Thus the hook 46 and sheave 47 serve as an elevating device for the carrier, which is operated by the draft-cable 37, the latter serving also to draw the loaded carrier suspended from carriage 35, from one end of the track to the other.

The suspension-bar 43 is provided with a notch 48 adapted to receive and hold the bail 23 so that when hook 46 is connected to the suspension-bar 43 and the bail is held in notch 48, the loaded carrier will be elevated bodily without discharging the load. When the loaded carrier has been elevated into substantially the position illustrated in Fig. 1, the draft-cable 37 will draw the carriage 35 to the opposite end of the track beneath which the wagon or spreader is located to receive the manure from the carrier. When the carrier and carriage have been moved to a point above the wagon or spreader, the load will be discharged to fall into the vehicle. The dumping operation of the carrier is effected by a tripping-device which releases the bail 23 from notch 48 in the suspension-bar so that the front end of the front or free ends of the carrier-teeth will be free to gravitate, being held at the rear by the connection between the suspension-bar and the back of the toothed carrier. This tripping-device comprises a lever 49 pivoted as at 50 to the suspension-bar and having a notch or recess 51 into which the bail is adapted to pass when held in the notch 48 in the suspension-bar and a cam 52 formed on the trip-lever to force the bail out of notch 48 when the lever is operated. A spring 53 holds the trip-lever normally in operative position and a rope 54 or the like is connected to one end of the trip-lever so that the lever may be operated to release the bail and force it out of the notch 48. When the trip-lever is in the position illustrated in Fig. 4, the bail 23 will be free to permit the front of the forked carrier to swing downwardly so that the load will be discharged into the vehicle above which the loaded carrier is suspended. When a load has been discharged from the carrier, the latter and the carriage 35 may be drawn backwardly to the opposite end of the track by the trip-rope 54 and the carrier may also be lowered by pulling said rope downwardly. The toothed carrier will next be disconnected from the lifting-hook 46 or if desired, the suspension-bar 43 may be unhooked at 44 so that the carrier will be disconnected from the elevator and shifting-cable 37. The carrier may then be pushed into the pile of material to receive another load, or, if desired, the carrier may be placed in such position on the pile that by connecting hook 45 to the bail and operating cable 37, the carrier-teeth will be forced to scoop a quantity of material from the pile and onto the carrier. Or, if desired, the bail may be otherwise connected to a horse or team, so that the carrier will be loaded and drawn into position to be connected to the elevating-device. When the carrier has been loaded and is in position to be elevated the bail and suspension-bar 43 will be connected so that the bail will be locked to the suspension-bar, as illustrated in Figs. 2 and 3, the suspension-bar and bail then serving as a three-point suspension-device whereby the carrier and its load may be elevated and transported. The suspension-bar is next connected to the lifting-hook 45 and the loaded carrier will be first elevated and then drawn along the track until it is suspended over the vehicle to be loaded. The tripping-lever will be operated by depending cable 54 to unlock the bail and force it out of notch 48, so the front end of the carrier will be free to gravitate into position to discharge the load as shown in dotted lines Fig. 1, and the loaded carrier will be immediately dumped into the vehicle.

Thus it will be seen that the invention provides a toothed carrier adapted to receive a large quantity of material and which may be forced into the pile of material to scoop up a large load and when it has been loaded, may be quickly elevated and transported into position to discharge the load into a vehicle. When the carrier has been elevated and transported into position above the vehicle, it may be quickly operated by gravity into such position that the load will be dumped into the vehicle at any desired point. Therefore in loading material, such as manure and the like, a very material saving of time is effected in loading a wagon or spreader. Furthermore, the entire apparatus may be operated by one person which is advantageous when there is a scarcity of labor.

The carrier having its bottom formed essentially of teeth which are adapted to penetrate a pile of material, makes it possible to quickly load the carrier for elevation and transportation to the vehicle. The suspension-means set forth, together with the tripping-device, make it possible to quickly dump the load after it has been elevated and to transport it into position above the vehicle to be loaded. The bail serves as a suspension-member during elevation and transportation of the carrier and also serves as a draw-bar or means by which the carrier may be drawn, to cause its teeth to penetrate a pile, or over the ground into position to be connected to the elevating-device.

The invention is not to be restricted to the details set forth since these may be modified within the scope of the appended claims without departing from the spirit and scope of the invention.

Having thus described the invention, what I claim as new and desire to secure by Letters Patent, is:—

1. In a loader, the combination of a carrier comprising a series of forwardly extending teeth at the bottom of the carrier for penetrating a pile of material to receive a load, and suspension-means comprising a bar pivotally connected to the carrier at the rear thereof and a detachable connection between said bar and the sides of the carrier.

2. In a loader, the combination of a carrier comprising a series of forwardly extending teeth at the bottom of the carrier for penetrating a pile of material to receive a load, and suspension-means for the carrier comprising a bar pivotally connected to the carrier at the rear thereof, a bail connected to the carrier at the sides thereof, and a detachable connection between said bar and said bail.

3. In a loader, the combination of a carrier comprising a series of forwardly extending teeth at the bottom of the carrier, suspension-means comprising a bar pivotally connected to the carrier at the rear thereof, and means connected to the carrier at the sides thereof and detachably connected to said bar, and a tripping-device for releasing said means to release the carrier to dump the load.

4. In a loader, the combination of a carrier comprising a series of forwardly extending teeth at the bottom of the carrier, suspension-means for the carrier comprising a bar pivotally connected to the carrier at the rear thereof, a bail connected to the carrier at the sides thereof and detachably connected to said bar, and a tripping-device for releasing said bail to release the carrier to dump the load.

5. In a loader, the combination of a carrier comprising a series of forwardly extending teeth at the bottom of the carrier, suspension-means for the carrier comprising a bar pivotally connected to the carrier at the rear thereof, said bar being provided with a seat, and means adapted to be held in said seat and connected to the carrier at the sides thereof, and a tripping-device for disengaging said means from its connection to the bar to release the carrier to dump the load.

6. In a loader, the combination of a carrier comprising a series of forwardly extending teeth at the bottom of the carrier, suspension-means for the carrier comprising a bar pivotally connected to the carrier at the rear thereof, said bar being provided with a seat, and a bail adapted to be held in said seat and connected to the carrier at the sides thereof and a tripping-device for disengaging said bail from its connection to the bar to release the carrier to dump the load.

7. In a loader, the combination of a carrier comprising a series of forwardly extending teeth at the bottom of the carrier, suspension-means for the carrier comprising a bar pivotally connected to the carrier at the rear thereof, and means connected to the carrier at the sides thereof and detachably connected to said bar, and a tripping-lever for releasing said means to release the carrier to dump the load.

8. In a loader, the combination of a carrier comprising a series of forwardly extending teeth at the bottom of the carrier, suspension-means comprising a bar pivotally connected to the carrier at the rear thereof, a bail connected to the carrier at the sides thereof and detachably connected to said bar, and a tripping lever for releasing said bail to release the carrier to dump the load.

9. In a loader, the combination of a carrier comprising a series of forwardly extending teeth at the bottom of the carrier, suspension-means comprising a bar pivotally connected to the carrier at the rear thereof, said bar being provided with a seat, and means adapted to be held in said seat and connected to the carrier at the sides thereof, and a tripping-lever for disengaging said means from its connection to the bar to release the carrier to dump the load.

10. In a loader, the combination of a carrier comprising a series of forwardly extending teeth at the bottom of the carrier, suspension-means comprising a bar pivotally connected to the carrier at the rear thereof, said bar being provided with a seat, and a bail adapted to be held in said seat and pivotally connected to the carrier at the sides thereof, and a tripping-lever for disengaging said bail from its connection to the bar to release the carrier to dump the load.

11. In a loader, the combination of a carrier comprising a series of forwardly extending teeth at the bottom of the carrier, a back and sides, a suspension-bar connected to the carrier at the back thereof, said bar having means whereby it may be detachably connected to the elevating-device, and means connected to the carrier at the sides thereof and removably connected to said bar, said means being pivoted to the carrier so it may be disconnected from the bar and used for drawing the carrier.

12. In a loader, the combination of a carrier comprising a series of forwardly extending teeth at the bottom of the carrier, a back and sides, a suspension-bar connected to the carrier at the back thereof, said bar having means whereby it may be detachably connected to an elevating-device, means connected to the carrier at the sides thereof and removably connected to said bar, said means being pivoted to the carrier so it may be disconnected from the bar and used for drawing the carrier, and a tripping-device for releasing said means from the suspension-bar to release the carrier to dump the load.

13. In a loader, the combination of a carrier comprising a series of forwardly extending teeth at the bottom of the carrier, a back and sides, a suspension-bar connected to the carrier at the back thereof, said bar having means whereby it may be detachably connected to an elevating device, and a bail connected to the carrier at the sides thereof and removably connected to said bar, said bail being pivoted to the carrier so it may be disconnected from the back and used for drawing the carrier.

14. In a loader, the combination of a carrier comprising a series of forwardly-extending teeth at the bottom of the carrier, a back and sides, a suspension-bar connected to the carrier at the back thereof, said bar having means whereby it may be detachably connected to an elevating-device, a bail connected to the carrier at the sides thereof and removably connected to said bar said bail being pivoted to the carrier and to the bar so it may be disconnected therefrom and used for drawing the carrier, and a tripping-device for releasing said bail from the suspension-bar to release the carrier to dump the load.

15. In a loader, the combination of a carrier comprising a series of forwardly extending teeth at the bottom of the carrier, a back and sides, a suspension-device comprising a bar connected to the back of the carrier and a bail connected to the carrier at the sides thereof, a detachable connection between the bail and said bar, a lever pivoted on the bar for releasing the bail to release the carrier to dump the load, and depending-means whereby said lever may be operated.

16. In a loader, the combination of a carrier comprising a series of forwardly extending teeth at the bottom of the carrier, a back and sides, a suspension-device comprising a bar connected to the back of the carrier and a bail connected to the carrier at the sides thereof, a detachable connection between the bail and said bar, a lever pivoted on the bar and for releasing the bail to release the carrier to dump the load, and depending-means whereby said lever may be operated, said bail being pivoted to the carrier so it may be swung to extend forwardly and whereby the carrier may be drawn.

17. In a loader, the combination of an overhead track or guide, a carriage mounted to travel thereon, a carrier comprising a series of forwardly projecting teeth at the bottom of the carrier, a suspension-device for the carrier, elevating-means detachably connected to the carrier, and means whereby the carrier may be drawn when disconnected from the elevating-means, said draft means being detachably connectable to the suspension device, and means for disconnecting the draft means from the suspension-device.

18. In a loader, the combination of an overhead track or guide, a carriage mounted to travel thereon, a carrier comprising a series of forwardly projecting teeth at the bottom of the carrier, an elevating-means detachably connected to the carrier, means whereby the carrier may be drawn when disconnected from the elevating-means, a suspension-bar connected to the rear of the carrier, and suspension-means connected to the carrier at the sides thereof, and a detachable connection between said suspension-means and said bar for releasing the carrier to dump the load.

CARL EHLERS.

Witnesses:
H. B. JUNGFERMAN,
J. W. MILLER.